US012623295B2

(12) United States Patent 
Salazar Tello et al.

(10) Patent No.: US 12,623,295 B2 
(45) Date of Patent: May 12, 2026

(54) MANDREL ASSEMBLY FOR USE WITH A ROTARY TOOL

(71) Applicant: Robert Bosch GmbH, Stuttgart (DE)

(72) Inventors: Andres David Salazar Tello, Mexicali (MX); Kevin Wasielewski, Downers Grove, IL (US)

(73) Assignees: Robert Bosch Tool Corporation, Mt. Prospect (IL); Robert Bosch GmbH, Stuttgart (DE)

( * ) Notice: Subject to any disclaimer, the term of this patent is extended or adjusted under 35 U.S.C. 154(b) by 425 days.

(21) Appl. No.: 18/196,731

(22) Filed: May 12, 2023

(65) Prior Publication Data

US 2024/0375188 A1 Nov. 14, 2024

(51) Int. Cl. 
*B23B 31/40* (2006.01) 
*B23B 31/10* (2006.01)

(52) U.S. Cl. 
CPC .............. *B23B 31/40* (2013.01); *B23B 31/10* (2013.01)

(58) Field of Classification Search 
CPC ....... B23B 31/40; B23B 31/10; B23B 31/112; B23B 51/12; B27B 5/32; B23D 61/10; B23D 51/10; B25F 5/00; B24B 45/006 
See application file for complete search history.

(56) References Cited

U.S. PATENT DOCUMENTS 862,838 A * 8/1907 Murry ................... B23D 51/10 
 279/90 
1,941,840 A 1/1934 Kelsey

| 4,561,217 | A | 12/1985 | Steyskal |
|---|---|---|---|
| 4,657,428 | A | 4/1987 | Wiley |
| 4,730,952 | A | 3/1988 | Wiley |
| 7,387,563 | B2 | 6/2008 | Allemann et al. |
| 7,484,736 | B2 | 2/2009 | Allemann et al. |
| 7,614,940 | B2 | 11/2009 | Jerome et al. |
| 8,096,855 | B2 | 1/2012 | Jermone et al. |
| 8,641,049 | B2 * | 2/2014 | Marini ................... B23D 51/10 |
| | | | 279/81 |
| 9,687,917 | B2 | 6/2017 | Pamatmat |
| 9,751,135 | B1 | 9/2017 | Terris |
| 10,471,518 | B2 | 11/2019 | Klabunde et al. |

(Continued)

FOREIGN PATENT DOCUMENTS

| CN | 102069482 | 6/2013 |
|---|---|---|
| CN | 214351701 | 10/2021 |

(Continued)

OTHER PUBLICATIONS

PCT International Search Report for PCT/EP2024/062102.

*Primary Examiner* — Sara Addisu 
(74) *Attorney, Agent, or Firm* — Kelly McGlashen

(57) ABSTRACT

A mandrel assembly may be used with a rotary power tool to provide a reliable and stable connection between the rotary tool and a tool accessory. The mandrel assembly provides a quick-connect/quick-release connection between the tool output shaft and the accessory via a clamping action. In particular, the mandrel assembly is movable between first and second configurations. In the first configuration, the accessory may clamped between a clamping element formed on one end of the mandrel and a collar which surrounds the mandrel. In the second configuration, the accessory may be loaded onto or detached from the mandrel assembly.

16 Claims, 5 Drawing Sheets

(56)          References Cited

U.S. PATENT DOCUMENTS

| | | | |
|---|---|---|---|
| 10,525,560 B2 | 1/2020 | Haimer | |
| 2006/0107803 A1 * | 5/2006 | Ragazzini | B23B 13/08 |
| | | | 82/124 |
| 2014/0070499 A1 * | 3/2014 | Fankhauser | B24B 23/04 |
| | | | 279/141 |
| 2014/0110908 A1 * | 4/2014 | Fankhauser | A61B 17/142 |
| | | | 279/141 |
| 2015/0042052 A1 * | 2/2015 | Furusawa | B23B 31/10 |
| | | | 279/141 |
| 2020/0039026 A1 | 2/2020 | Luescher et al. | |
| 2020/0094373 A1 | 3/2020 | Leuscher et al. | |
| 2020/0156209 A1 | 5/2020 | Barth | |
| 2020/0306902 A1 | 10/2020 | Hofmann | |
| 2022/0388109 A1 | 12/2022 | Barth | |
| 2024/0001456 A1 * | 1/2024 | Rubens | B23D 61/10 |
| 2024/0066662 A1 * | 2/2024 | Rubens | B24B 45/006 |
| 2024/0375187 A1 * | 11/2024 | Salazar Tello | B23B 31/40 |

FOREIGN PATENT DOCUMENTS

| | | | | |
|---|---|---|---|---|
| CN | 113319606 | | 11/2021 | |
| DE | 102019220538 | | 6/2021 | |
| DE | 102020110218 | | 3/2022 | |
| EP | 1745889 | | 1/2007 | |
| EP | 1745889 A1 * | 1/2007 | B24B 45/006 | |
| EP | 1745890 | | 1/2007 | |
| EP | 1837124 | | 9/2007 | |
| EP | 1837124 A2 * | 9/2007 | B24B 45/006 | |
| JP | 2005203726 A * | 7/2005 | | |
| KR | 20200048046 | | 5/2020 | |
| WO | 1998043779 | | 10/1998 | |
| WO | 2021206207 | | 10/2021 | |

* cited by examiner

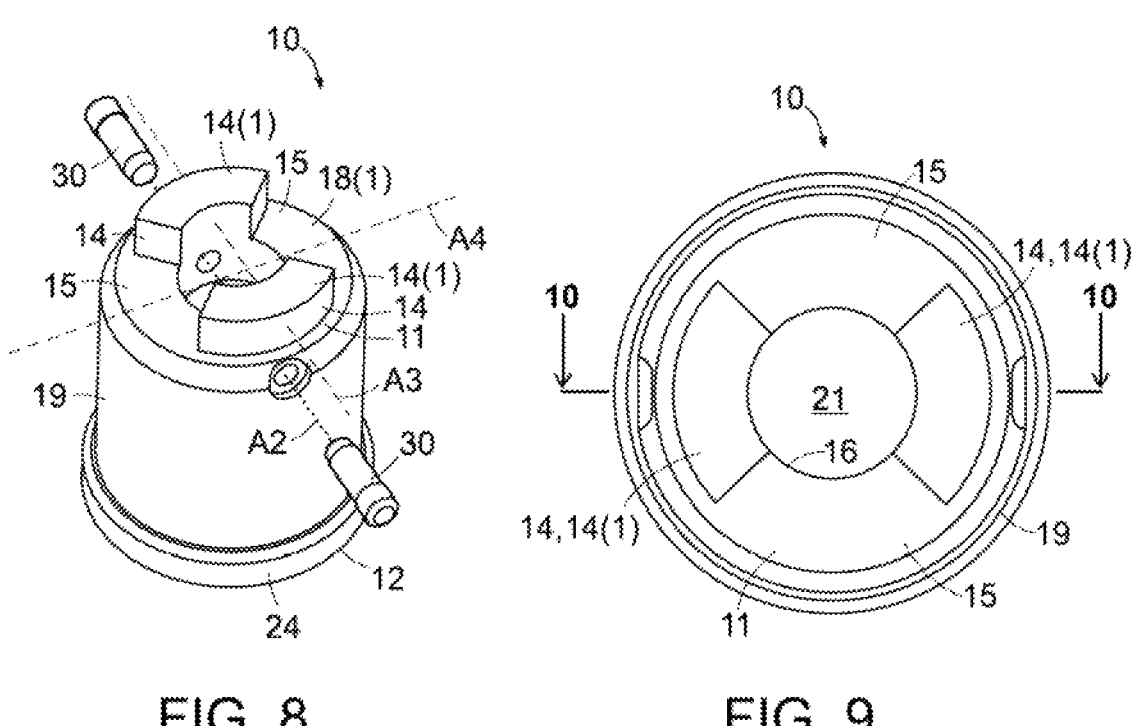
FIG. 8                    FIG. 9
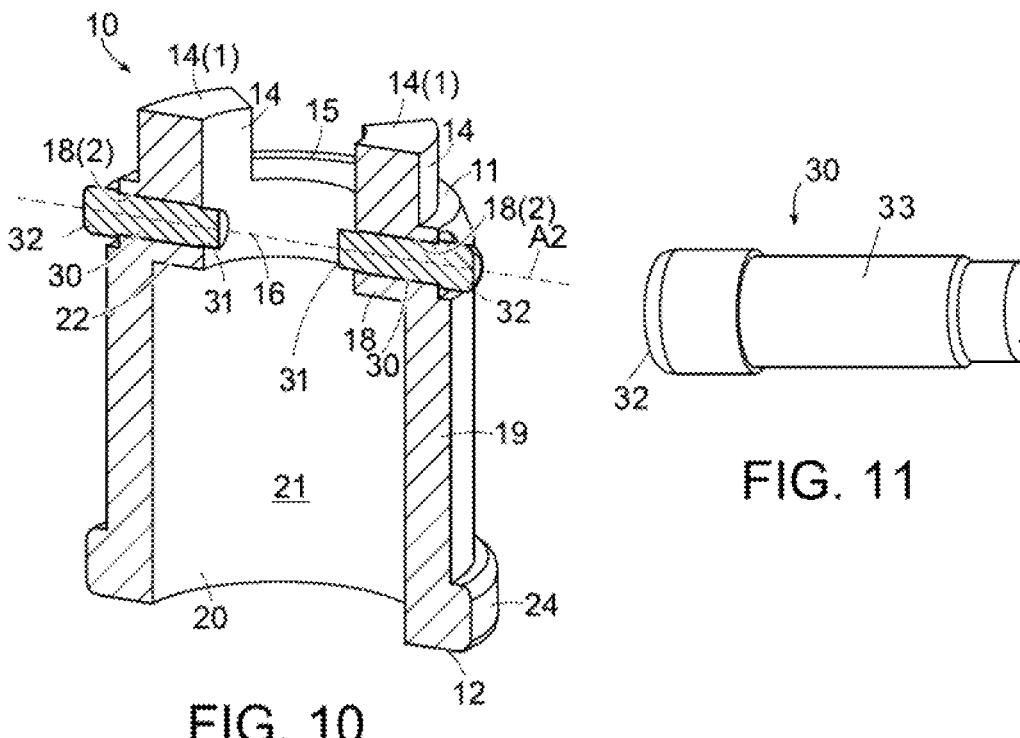
FIG. 10                    FIG. 11

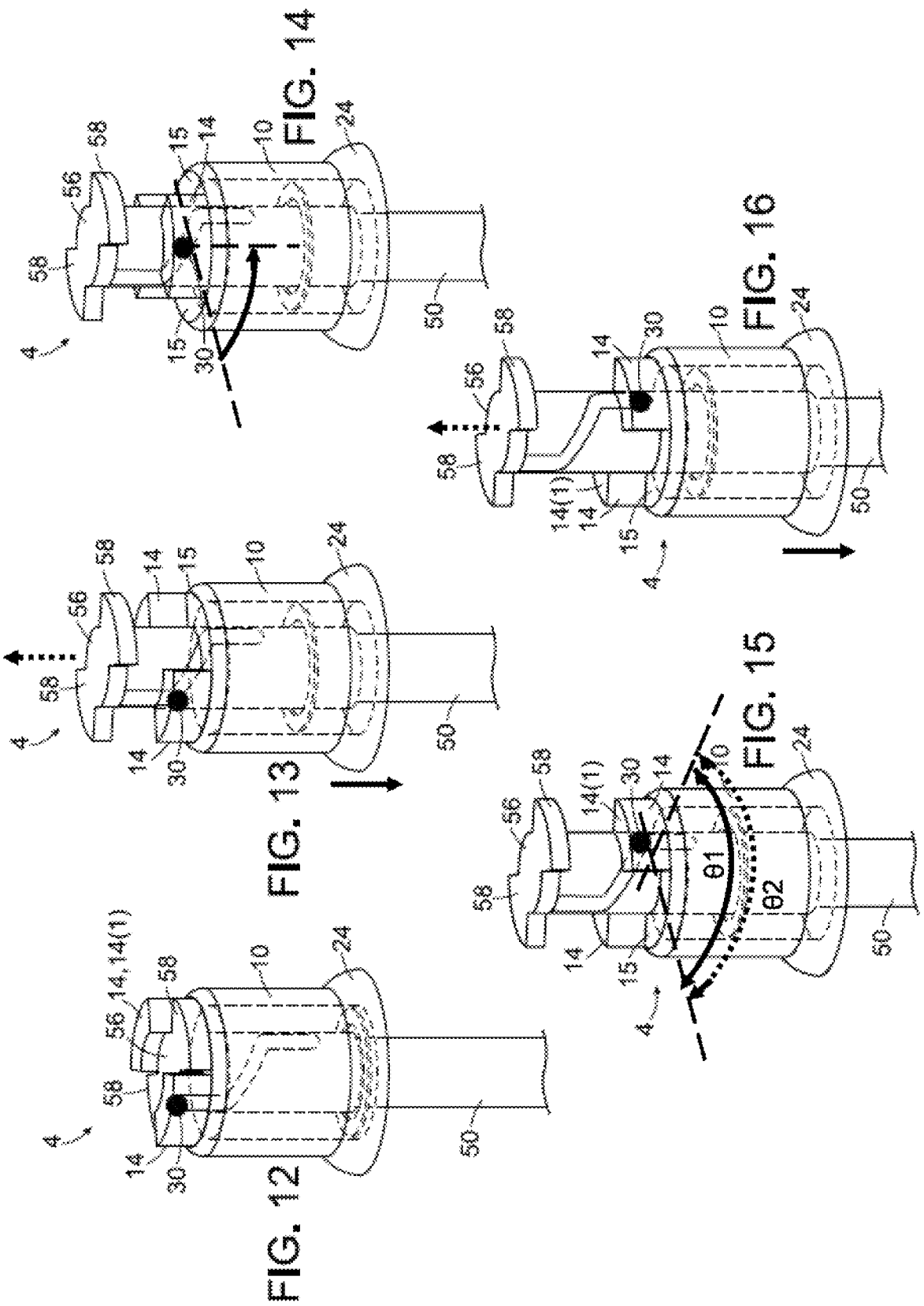

MANDREL ASSEMBLY FOR USE WITH A ROTARY TOOL

BACKGROUND

Hand held rotary tools typically include a tool housing designed to be easily held within a human hand. The housing contains an electric motor which is operable to drive a rotatable chuck of the rotary tool. A mandrel may be releasably coupled to the chuck so as to be rotatably driven by the rotary tool. In turn, an accessory may be releasably secured to the mandrel thereby enabling the rotary tool to rotatably drive the accessory. The accessory may be a cutting blade, a cut-off wheel, a polishing wheel, a grinding wheel, a sanding disc, or any other similar device.

Many types of mechanisms may be used to secure the accessory to the mandrel. In one example, a mandrel includes a base having a threaded aperture and a clamping screw that engages the aperture in order to clamp the accessory between the base and the clamping screw. In this example, a tool is required to tighten the clamping screw. In another example, an accessory is connected to the mandrel via a quick connection clamp that is operated via a lever provided on the tool for that purpose. In this example, the lever mechanism adds weight, complexity and cost to the tool. In both examples, with the accessory so clamped, rotation of the mandrel by the rotary tool causes rotation of the accessory thereby allowing the user to perform work on a workpiece.

Accordingly, it would be advantageous to provide a mandrel that can be used quickly and easily and does not require the use of an additional tool such as a screwdriver, or the use of a relatively small, separate component such as a clamping screw. In addition, it would be advantageous to provide a mandrel having a simple and easily operated mechanism.

SUMMARY

A mandrel assembly is disclosed that may be used with a rotary power tool to provide a reliable and stable connection between the rotary tool and a tool accessory. The mandrel assembly provides a quick-connect/quick-release connection between the tool output shaft and the accessory via a clamping action.

The mandrel assembly includes a mandrel in the form of a rigid rod, a collar having a bore that receives the mandrel therethrough, and a spring that is disposed in the bore and surrounds the mandrel. The mandrel assembly is configured so that the spring biases the collar toward one end of the mandrel. The mandrel assembly is operable to clamp the accessory between a clamping element formed on the one end of the mandrel and the collar which surrounds a portion of the mandrel.

The mandrel assembly is manually transformable between a first, retracted configuration and a second, advanced configuration. In the retracted configuration, the clamping element is engaged with the collar and the accessory may be fixed relative to the collar via a clamping force and engagement of the collar with the accessory. In the advanced configuration, the clamping element is spaced apart from the collar and the accessory can be mounted on the collar or detached from the collar. The transformation of the mandrel assembly between the first and second configurations is achieved by relative movement of the collar and the mandrel in a predetermined motion. The predetermined motion is set by the shape of slots, which may also be referred to as "guide tracks," that are formed in the mandrel and are engaged by pins that protrude radially inward from an inner surface of the collar. A slot is provided on each of opposed sides of the mandrel. The slots are engaged by pins that protrude from an inner surface of the collar toward the mandrel. The slot follows a curvilinear path that guides the mandrel to turn 90 degrees while moving longitudinally relative to the collar.

The slot is configured so that a biasing force of the spring maintains the clamping element in a given one of the retracted or advanced configurations. To that end, the slot provides two locked positions. The first locked position corresponds to the retracted configuration in which the pins are disposed in a first mandrel location, and the second locked position corresponds to the advanced configuration in which the pins are disposed in a fourth mandrel location.

The first locked position corresponds to a dead end of the slot, while the second locked position corresponds to a step portion of the slot. When the pins are disposed in either of the first or second locked positions, the relative positions of the mandrel and collar are maintained without requiring the user to manually apply force. This can be compared to some conventional connection assemblies in which, in order to install an accessory, it is necessary to hold down the collar while inserting and turning the accessory itself. This combination of movements may be difficult in the conventional connection assemblies since the conventional connection assemblies may include a spring that pushes the collar against the head of the shaft. To change between the retracted and advanced configurations, the user simply moves the collar or accessory axially with respect to the mandrel.

In some aspects, a mandrel assembly includes a mandrel, a collar, a retention washer and a spring. The mandrel includes a mandrel first end having a mandrel clamping element, a mandrel second end that is opposite the mandrel first end, a longitudinal axis that extends through the mandrel first end and the mandrel second end, and a slot provided in an outer surface of the mandrel. The collar surrounds the mandrel and includes a collar first end, a collar second end that is opposite the first end, and a sidewall that extends between the collar first end and the collar second end. The sidewall includes an inner surface that defines a bore, the bore opening at the collar first end and the collar second end. The bore has a step change in diameter that defines a collar inner shoulder. The collar includes a pin that protrudes from a surface of the bore and is received in the slot. The retention washer is fixed to the mandrel between the slot and the mandrel second end. In addition, the spring surrounds the mandrel and extends between the retention washer and the collar inner shoulder. When the collar is moved relative to the mandrel in a first direction, the slot is configured to permit the mandrel to move relative to the collar in both rotation through a first angle about the longitudinal axis and translation in a second direction. The second direction is opposite the first direction. When the collar is moved relative to the mandrel in the second direction, the slot is configured to permit the mandrel to move relative to the collar in both rotation through a second angle about the longitudinal axis and translation in the first direction. The second angle is opposite the first angle.

In some embodiments, at a first location of the slot, the slot is configured so that a biasing force of the spring maintains the mandrel clamping element at a first distance from the collar. At a second location of the slot, the slot is configured so that a biasing force of the spring maintains the mandrel clamping element at a second distance from the collar. The second distance is greater than the first distance.

In some embodiments, when the collar is moved relative to the mandrel in the first direction, the slot is configured to permit the mandrel to translate linearly in the second direction, then rotate through the first angle, and then translate linearly in the second direction.

In some embodiments, the first angle is 90 degrees.

In some embodiments, the second angle is 90 degrees.

In some embodiments, the first and second directions are parallel to the longitudinal axis.

In some embodiments, the slot is configured so that as the mandrel rotates through one of the first angle and the second angle, the mandrel also translates in a direction parallel to the longitudinal axis.

In some embodiments, the slot includes a first slot portion that extends linearly and in a direction parallel to the longitudinal axis, and a second slot portion that adjoins the first slot portion, the second slot portion extending in a direction parallel to the longitudinal axis and circumferentially along a curved path. In addition, the slot includes a third slot portion that adjoins the second slot portion, the third slot portion extending linearly and circumferentially, and fourth slot portion that adjoins the third slot portion, the fourth slot portion extending linearly and axially.

In some embodiments, the second and third slot portions in combination provide a path that when traveled by the pin results in a 90 degree rotation of the mandrel about the longitudinal axis.

In some embodiments, movement of the pin in the first slot portion corresponds to a motion of the mandrel relative to the collar in which the mandrel clamping element is translated in the first direction, movement of the pin in the second slot portion corresponds to a motion of the mandrel relative to the collar in which the mandrel clamping element is translated in the first direction and in which the mandrel rotates about the longitudinal axis, movement of the pin in the third slot portion corresponds to a motion of the mandrel relative to the collar in which the mandrel rotates about the longitudinal axis, and movement of the pin in the fourth slot portion corresponds to a motion of the mandrel relative to the collar in which the mandrel clamping element is translated in the first direction.

In some embodiments, the first slot portion initiates at the mandrel first end, the second slot portion, the third slot portion and the fourth slot portion are disposed between the mandrel first end and a mandrel shoulder, and the mandrel shoulder is disposed between the mandrel first end and a point of the mandrel that is midway between the mandrel first end and the mandrel second end.

In some embodiments, the collar includes posts that protrude from the collar first end in a direction parallel to the longitudinal axis and the collar includes lands disposed between each adjacent pair of posts. Upon a relative movement in a direction parallel to the longitudinal axis between the collar and the mandrel, the slot is configured to permit the mandrel to move relative to the collar from a first configuration in which the mandrel clamping element is aligned with and abutting the lands, to a second configuration in which the mandrel clamping element is aligned with the posts and spaced apart from the posts.

In some embodiments, the slot includes a first mandrel location corresponding to a first locked position in which a biasing force of the spring maintains the clamping element in a retracted configuration relative to the collar, and a second mandrel location corresponding to a second locked position in which a biasing force of the spring maintains the clamping element in a retracted configuration relative to the collar.

In some embodiments, the first mandrel location corresponds to one end of the slot.

In some embodiments, the second mandrel location is disposed at a location between, and spaced apart from, each end of the slot.

In some embodiments, the first locked position corresponds to a dead end of the slot, and the second locked position corresponds to a step portion of the slot.

BRIEF DESCRIPTIONS OF THE DRAWINGS

FIG. 8 is a top perspective view of the collar.

FIG. 9 is a top end view of the collar.

FIG. 10 is a cross-sectional view of the collar as seen along line 10--10 of FIG. 9.

FIG. 11 is a perspective view of a pin.

FIG. 12 is a perspective view a portion of the mandrel assembly of FIG. 1 illustrating the pin in the first slot portion and in the first mandrel location whereby the mandrel clamping element is aligned with and abuts the collar lands.

FIG. 13 is a perspective view of a portion the mandrel assembly of FIG. 1 illustrating the pin in the first slot portion and in the second mandrel location and illustrating the mandrel clamping element aligned with the collar lands and spaced apart from the collar lands.

FIG. 14 is a perspective view of a portion of the mandrel assembly of FIG. 1 illustrating the pin in the second slot portion and between the second and third mandrel locations and illustrating the mandrel clamping element mis-aligned with the collar posts and axially spaced apart from the collar posts.

FIG. 15 is a perspective view of a portion of the mandrel assembly of FIG. 1 illustrating the pin in the third slot portion and in the fourth mandrel location and illustrating the mandrel clamping element aligned with the collar posts and axially spaced apart from the collar posts.

FIG. 16 is a perspective view of the mandrel assembly of FIG. 1 illustrating the pin in the fourth slot portion and in the fifth mandrel location and illustrating the mandrel clamping element aligned with the collar posts and at a maximal axial spacing from the collar posts.

DETAILED DESCRIPTION

Figures 1, 2, 3:
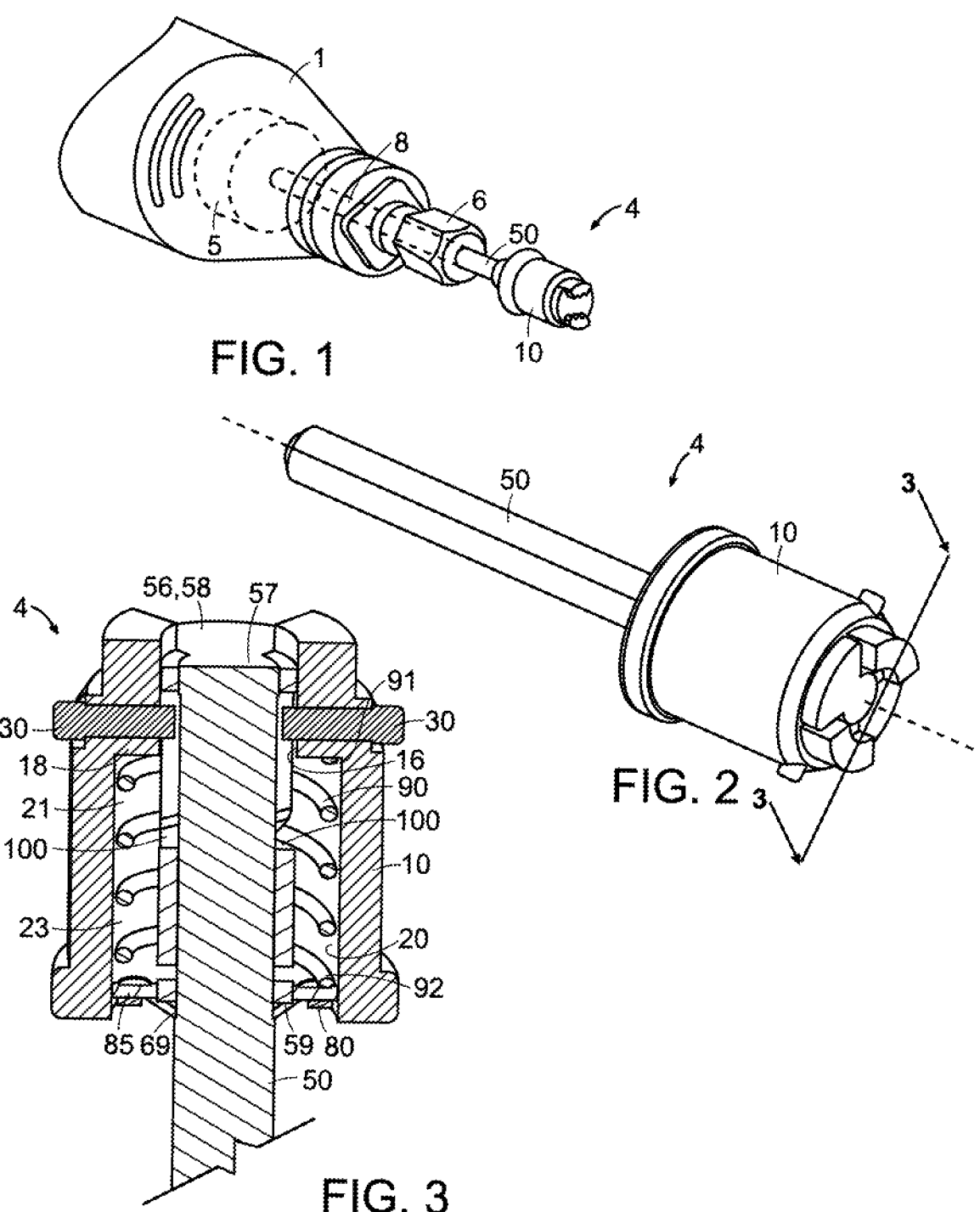
FIG. 1 is a perspective view of a mandrel assembly connected to the chuck of a rotary tool.
FIG. 2 is a perspective view of the mandrel assembly of FIG. 1.
FIG. 3 is a cross-sectional view of the mandrel assembly of FIG. 1 as seen along line 3-3 of FIG. 2.
Figure 4:
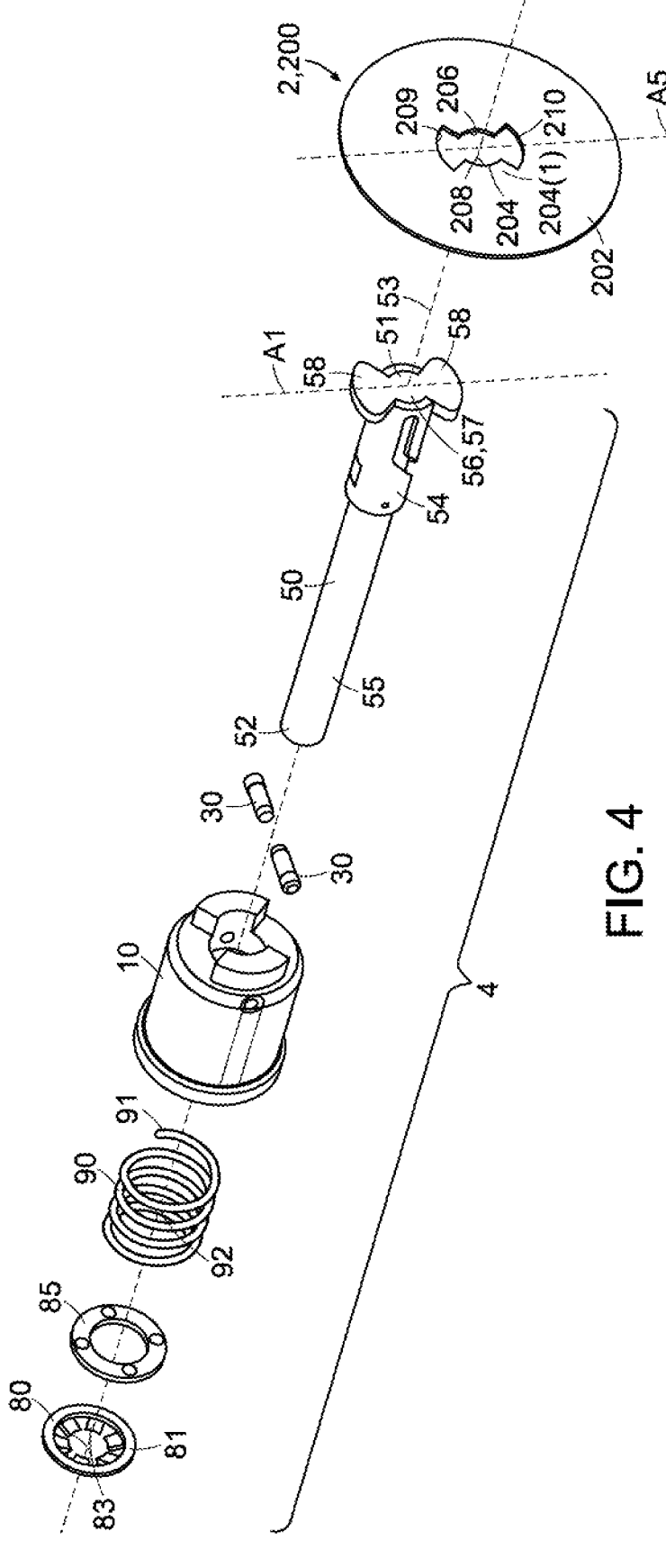
FIG. 4 is an exploded view of the mandrel assembly of FIG. 1 and an accessory.

Referring to FIGS. 1 and 4, a mandrel assembly 4 may be used with a power rotary tool 1 to provide a reliable and stable connection between the rotary tool 1 and a tool accessory 2. The rotary tool 1 includes an electric motor 5. An output shaft 8 of the motor 5 terminates in a chuck 6 configured to be coupled to a mandrel 50 of the mandrel assembly 4. The tool accessory 2 such as a cut-off wheel 200 is configured to be releasably connected to the mandrel assembly 4 via a quick-release clamping action, as discussed in detail below. Operation of the rotary tool 1 rotates the chuck 6, which in turn rotates the mandrel assembly 4, thereby imparting rotary movement to the cut-off wheel 200.

Referring to FIGS. 2-4, the mandrel assembly 4 includes the mandrel 50, a collar 10 having a bore 21 that receives the mandrel 50 therethrough, and a coil spring 90 that surrounds the mandrel 50 and is disposed in the bore 21. The coil spring 90 is retained in the bore 21 via a retention washer 80. The mandrel assembly 4 also includes a flat washer 85 disposed between the retention washer 80 and one end 92 of the coil spring 90. The constituents of the mandrel assembly 4 will now be described in detail.

Referring to FIGS. 4-7, the mandrel 50 is a rigid, elongate and generally rod-shaped structure having a first end 51 and a second end 52 that is opposite the first end 51. The mandrel 50 includes a longitudinal axis 53 that extends through the mandrel first and second ends 51, 52 and corresponds to a rotational axis of the mandrel assembly 4. As used herein, the term "axially" refers to the longitudinal axis 53 or a direction parallel to the longitudinal axis 53 and the term "radially" refers to a direction along a radius that is perpendicular to and intersects the longitudinal axis 53.

The mandrel 50 is cylindrical and has a step change in diameter such that the mandrel first end 51 has a greater diameter than the mandrel second end 52. The mandrel 50 includes a mandrel shoulder 59 at the transition between the large diameter portion 54 and the small diameter portion 55. The mandrel shoulder 59 is located between the mandrel first end 51 and a point 60 that is midway between the mandrel first and second ends 51, 52.

The mandrel 50 includes a shallow annular groove 69 that extends circumferentially. In the illustrated embodiment, the groove 69 is provided in the small diameter portion 55 at a location adjoining the mandrel shoulder 59.

The mandrel first end 51 defines a rigid mandrel clamping element 56. The mandrel clamping element 56 is a plate that extends in a plane that is perpendicular to the longitudinal axis 53. The plate has an irregular profile that defines a central circular hub 57 and pair of arms 58 that protrude from opposite sides of the hub 57. Each arm 58 has the shape of a circular sector whereby the mandrel clamping element 56 has the appearance of a bow tie when viewed in a direction parallel to the longitudinal axis 53. The hub 57 is centered on the longitudinal axis 53, and the arms 58 are disposed on opposite sides of the hub 57 and are aligned along a first axis A1 that is that is perpendicular to and intersects the longitudinal axis 53. By this configuration, the mandrel 50 has a T-shape when viewed in a side view.

The mandrel second end 52 is configured to be received in the chuck 6 of the rotary tool 1. In the illustrated embodiment, the mandrel second end 52 is rounded to facilitate insertion into the chuck 6.

A pair of slots 100 are provided in the surface of the mandrel large diameter portion 54 so as to be disposed between the mandrel first end 51 and the mandrel shoulder 59. The slots 100 are identical and are disposed on opposed sides of the mandrel 50. Each slot 100 is equally spaced from each of the mandrel first end 51 and the mandrel shoulder 59. The slots 100 form paths that are configured to be traveled by the respective pins 30 of the collar 10, which are described below. To this end, each slot 100 is dimensioned to receive a pin 30 and to permit the pin 30 to translate therein. The slots 100 have an irregular shape that is designed to guide the pins 30 along a predetermined path that results in both translation and rotation of the mandrel 50 with respect to the collar 10 and the longitudinal axis 53. Details of the slot 100 and of the interaction between the pins 30 and the slots 100 are described below.

Referring to FIGS. 3 and 8-10, the collar 10 is a hollow, rigid cylinder that surrounds a portion of the mandrel 50. The collar 10 includes a sidewall 19 that extends between a collar first end 11 and a collar second end 12 that is opposite the collar first end 11. An inner surface 20 of the sidewall 19 defines the bore 21. The bore 21 is centered on the longitudinal axis 53 and has a diameter that is greater than that of the mandrel large diameter portion 54, whereby an annular gap 23 exists between the mandrel 50 and the sidewall inner surface 20. The gap 23 is dimensioned to receive the coil spring 90 that is positioned around the mandrel 50 as discussed below.

The collar first end 11 is closed by an end wall 18 except for a centrally-disposed opening 16 through which the mandrel 50 protrudes. The opening 16 is dimensioned to permit the mandrel 50 to rotate and translate freely with respect to the collar 10. An outer surface of the end wall 18 defines a first end surface 18(1) that is perpendicular to the longitudinal axis 53. The end wall 18 includes a pair of diametrically opposed end wall through openings 18(2) that extend in a direction perpendicular to the longitudinal axis 53 and communicate with the bore 21.

Referring to FIGS. 8-11, the collar 10 includes a pair of pins 30. In the illustrated embodiment, the pins are identical and each pin 30 has an inner end 31, an outer end 32 and a midportion 33 disposed between the inner and outer ends 31, 32. Each pin 30 has non-uniform diameter such that the outer end 32 has a larger diameter than the midportion 33, and the midportion 33 has a larger diameter than the inner end 31. The midportion 33 of each pin 30 is press fit within a corresponding one of the end wall through openings 18(2), and the inner end 31 protrudes into the opening 16. The pins 30 are disposed on opposed sides of the opening 16 and are aligned along a second axis A2 that is perpendicular to and intersects the longitudinal axis 53. The inner end 31 of each pin 30 is shaped and dimensioned to be received with a sliding fit in a corresponding slot 100 provided in the mandrel large diameter portion 54, as discussed in detail below. The outer end 32 of each pin 30 has a diameter that is greater than the corresponding one of the end wall through openings 18(2) whereby the outer end 32 resides outside the collar 10 and limits the depth to which the pin 30 can be inserted into the respective end wall through opening 18(2).

A pair of posts 14 protrude axially outward from the first end surface 18(1). The posts 14 are disposed on opposed sides of the opening 16 so as to be aligned along a third axis A3 that is that is parallel to and intersects the longitudinal axis 53. The third axis A3 is parallel to and axially aligned with the second axis A2 that extends through the pins 30. By this configuration, each pin 30 is axially aligned with a respective post 14. The posts 14 each have an arc shape when viewed in a direction parallel to the longitudinal axis 53. The portions of the first end surface 18(1) that are disposed between the posts 14 are referred to as lands 15. The lands 15 have the same shape and dimensions as the posts 14 and are axially recessed relative to the respective end faces 14(1) of the posts 14. Like the posts 14, the lands 15 are disposed on opposed sides of the opening 16 so as to be aligned along a fourth axis A4 that is that is perpendicular to and intersects the longitudinal axis 53, where fourth axis A4 is perpendicular to the third axis A3.

An inner surface of the end wall 18 defines a collar inner shoulder 22 that extends between the sidewall inner surface 20 and the central opening 16. The collar inner shoulder 22 faces the collar second end 12 and serves as a seat for a first end 91 of the coil spring 90.

The collar second end 12 includes an enlarged rim 24 that protrudes radially outward and extends around the circumference of the sidewall 19. The enlarged rim 24 provides a gripping surface that is useful to assist a user in manually gripping the collar 10 and urging the collar 10 to translate axially relative to the mandrel 50, as discussed further below.

Figures 5, 6, 7:
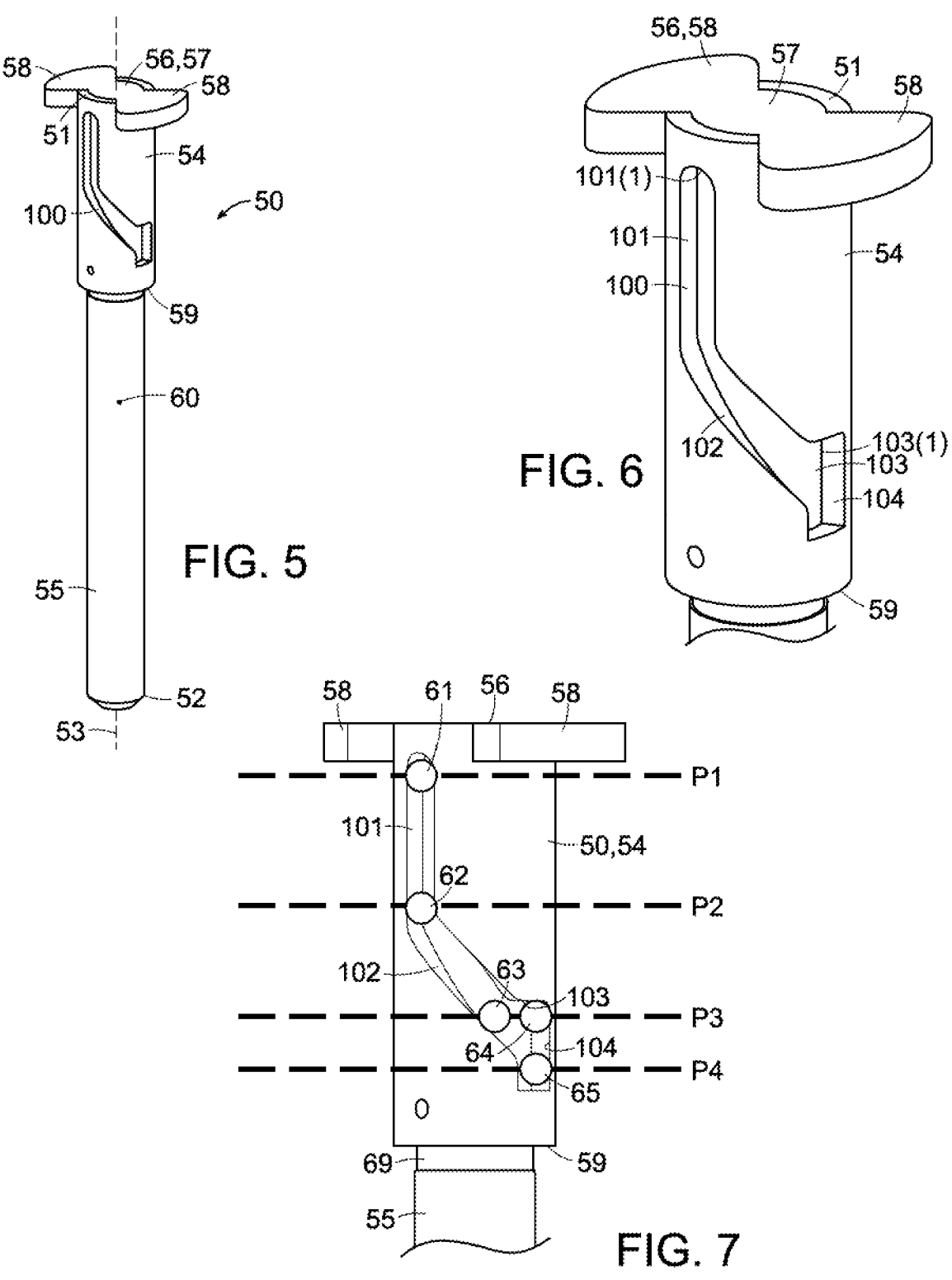
FIG. 5 is a perspective view of the mandrel.
FIG. 6 is a perspective view of an enlarged portion of the mandrel illustrating details of the slot.
FIG. 7 is a side view of au enlarged portion of the mandrel illustrating mandrel locations, represented by filled circles.

Referring to FIGS. 3-5, the mandrel 50 is retained within the collar 10 via the retention washer 80 that surrounds the mandrel small diameter portion 55 at a location closely adjacent to the mandrel shoulder 59. In the illustrated embodiment, an outer periphery of the retention washer 80 is a flat annulus 81 having an outer diameter than is less than a diameter of the bore 21 and an inner diameter that is less than that of the mandrel small diameter portion 55. An inner periphery 82 of the retention washer includes circumferentially spaced teeth 83. The teeth 83 are angled such that the radially innermost edges of the teeth 83 are non-coplanar with respect to the annulus 81. As a result, the teeth 83 engage an outer surface of the mandrel small diameter portion 55 so as to fix the retention washer 80 relative to the mandrel 50. In the illustrated embodiment, the teeth 83 engage with the groove 69 of the mandrel 50 whereby the axial location of the retention washer 80 is secured. The retention washer 80 is positioned relative to the mandrel 50 so that the annulus 81 is radially aligned with the mandrel shoulder 59.

In addition to the retention washer 80, the mandrel assembly 4 includes the flat washer 85 having an inner diameter that is greater than the diameter of the mandrel large diameter portion 54 and an outer diameter that is received within the bore 21 with a clearance fit. The flat washer 85 is disposed on the mandrel large diameter portion 54 so as to abut the retention washer annulus 81. In addition, the flat washer 85 is disposed in the bore 21 between retention washer 80 and collar inner shoulder 22.

The mandrel assembly 4 includes the coil spring 90 that is disposed in the gap 23 between the collar 10 and the mandrel 50. The coil spring 90 is coaxial with, and surrounds, the mandrel 50. A first end 91 of the coil spring 90 abuts the collar inner shoulder 22, and the opposite, second end 92 of the coil spring 90 abuts the flat washer 85, which in turn abuts the retention washer 80. The coil spring 90 is dimensioned to be under compression in the mandrel assembly 4 so that the coil spring 90 biases the collar 10 toward the mandrel first end 51.

In some embodiments, the mandrel assembly 4 may include a hollow cylindrical spacer (not shown) that surrounds the mandrel small diameter portion 55 and is positioned adjacent to the retention washer 80 on a side of the retention washer 80 that is opposite the flat washer 85. The spacer functions to limit depth of insertion of the mandrel 50 into the chuck 6 of the rotary tool 1. In particular, when a user inserts the mandrel second end 52 into the chuck 6, physical interaction between the chuck 6 and the spacer occurs thereby preventing the user from further advancing the mandrel assembly 4 into the chuck 6. The spacer ensures that sufficient space is provided between the chuck 6 and the open second end 12 of the collar 10 when the mandrel assembly 4 is clamped to the chuck 6. Leaving sufficient space between these two components ensures that the collar 10 has enough space for axial travel so as to allow attachment and removal of the accessory 2 to and from the mandrel assembly 4.

Referring again to FIG. 4, the mandrel assembly 4 is operable to quickly and easily attach an accessory 2 to the rotary tool 1. The accessory 2, for example a cut off wheel 200, is secured to the mandrel first end 51 via a clamping action of the mandrel assembly 4. The cut-off wheel 200 includes a rigid hub 204 and a rigid disc portion 202 that surrounds the hub 204. The disc portion 202 defines an outer perimeter of the accessory 2, which in this embodiment provides a cutting surface. A centrally-located hub opening 206 is formed in the hub 204.

In the illustrated embodiment, the hub opening 206 defines a circular central cut out 208, a first cut out 209 disposed on one side of the central cut out 208 and a second cut out 210 disposed on a side of the central cut out 208 opposite the first cut out 209. The first cut out 209 and the second cut out 210 each have the shape of a circular sector whereby the hub opening 206 has the appearance of a bow tie when the accessory 2 is viewed in top plan view. The cut outs 208, 209, 210 are aligned along a fifth axis A5. The central cut out 208 has a diameter that accommodates the hub 57 of the mandrel first end 51 in a tolerance fit, and the first and second cut outs 209, 210 are shaped and dimensioned to receive the collar posts 14 therethrough in a tolerance fit. By this configuration, portions 204(1) of the hub 204 adjacent to the central cut out 208 are axially aligned with and abut the lands 15 of the collar 10 when the accessory 2 is connected to the mandrel assembly 4, as discussed below.

In some embodiments, the cut-off wheel 200 is formed by molding the disc portion 202 from a combination of materials that include abrasive materials, resin materials, and one or more fiberglass mesh segments. Such a molding process is well-known in the art of manufacturing cut-off wheels.

Referring to FIGS. 3-4 and 5-7, the mandrel 50 includes the slots 100 that each provide a guide track configured to guide the pins 30 of the collar 10 along a predetermined path that results in movement of the mandrel 50 relative to the collar 10. In particular, the slots 100 guide the pins 30 in such a way that the collar 10 both translates along, and rotates about, the longitudinal axis 53 of the mandrel 50.

Each slot 100 is dimensioned to receive the pins 30 in a clearance fit. Each slot 100 is disposed in the mandrel large diameter portion 54 and defines a curvilinear path. The term "curvilinear" refers to a path having both curved and linear portions.

The slots 100 are identical, so only one slot 100 will be described in detail. In the illustrated embodiment, the slot 100 includes four slot portions 101, 102, 103, 104. The slot portions 101, 102, 103, 104 extend between five predetermined locations 61, 62, 63, 64, 65 of the mandrel 50. The mandrel locations 61, 62, 63, 64, 65 are represented by filled circles in FIG. 7.

The first slot portion 101 extends between the first and second mandrel locations 61, 62. The first mandrel location 61 resides in a first plane PI that is perpendicular to the longitudinal axis 53, and the second mandrel location 62 is disposed in a second plane P2 that is perpendicular to the longitudinal axis 53. The first plane P1 is disposed at, or closely adjacent to, the mandrel first end 51. The second plane P2 is axially spaced apart from the first plane P1 and is disposed between the first plane P1 and the mandrel shoulder 59. The second mandrel location 62 is axially aligned with the first mandrel location 61, whereby the first slot portion 101 is linear and extends axially.

The second slot portion 102 extends between the second mandrel location 62 and the third mandrel location 63. The third mandrel location 63 resides in a third plane P3 that is perpendicular to the longitudinal axis 53. The third plane P3 is axially spaced apart from the first and second planes P1, P2, and is disposed between the second plane P2 and the mandrel shoulder 59. In addition, when viewed facing the collar first end 11, the third mandrel location 63 is spaced apart from the second mandrel location 62 along a circumference of the collar 10. For example, in some embodiments, the arc length of space between the second mandrel location 62 and the third mandrel location 63 (e.g., the arc length of the second slot portion 102) is 85 degrees. In other words, the third mandrel location 63 is offset relative to the second mandrel location 62 by 85 degrees along a circumference of the mandrel 50. The second slot portion 102 is slightly curved and extends both axially and circumferentially.

The third slot portion 103 extends between the third mandrel location 63 and the fourth mandrel location 64. The fourth mandrel location 64 resides in the third plane P3. The fourth mandrel location 64 is offset relative to the third mandrel location 63 along a circumference of the mandrel 50. The offset is five degrees along the mandrel circumference relative to the third mandrel location 63, corresponding to an offset in a range of 90 degrees relative to the second location 62 (e.g., the third mandrel location 63 is between the second mandrel location 62 and the fourth mandrel location 64 in a circumferential direction of the mandrel 50). By this configuration, the third slot portion 103 is linear and extends circumferentially.

The fourth slot portion 104 extends between the fourth and fifth mandrel locations 64, 65. The fifth mandrel location 65 resides in a fourth plane P4 that is perpendicular to the longitudinal axis 53. The fourth plane P4 is axially spaced apart from the first, second and third planes P1, P2 and P3. The fourth plane P4 is disposed between the third plane P3 and the mandrel shoulder 59. whereby the fifth mandrel location 65 is closer to the mandrel shoulder 59 than first through fourth mandrel locations 61, 62, 63, 64. The fifth mandrel location 65 is axially aligned with the fourth mandrel location 64, whereby the fourth slot portion 104 is linear and extends axially.

In the slot 100, the first and fourth slot portions 101, 104 are parallel to each other and offset along the circumference of the mandrel 50. In addition, the length of the first slot portion 101 (e.g., the axial distance between the first and second mandrel locations 61, 62) is greater than that of the fourth slot portion 104 (e.g., the axial distance between the fourth and fifth mandrel locations 64, 65). For example, in the illustrated embodiment, the length of the fourth slot portion 104 is about forty percent of the length of the first slot portion 101.

The third slot portion 103 has a dimension corresponding approximately to a diameter of the pin inner end 31 and is relatively short as compared to the first and fourth slot portions 101, 104. The third slot portion 103 intersects the fourth slot portion 104 at a right angle whereby the slot has the appearance of a step at this location.

Referring to FIGS. 7 and 12-15, the mandrel assembly 4 is manually transformable between a first, retracted configuration (FIG. 12) and a second, advanced configuration (FIG. 16). The mandrel assembly 4 is transformed from the first configuration to the second configuration by relative movement between the mandrel 50 and the collar 10 which is directed by movement of the pins 30 within the slots from the first mandrel location 61 to the fifth mandrel location 65. When transforming between the first configuration and the second configuration, the slots 100 guide the pins 30 along a predetermined path that results in both translation and rotation of the mandrel 50 with respect to the collar 10.

Transformation of the mandrel assembly 4 from the first configuration to the second configuration will now be described.

Initially, the mandrel assembly 4 may be in the first, retracted configuration (FIG. 12). In the first configuration, the pins 30 are disposed in the first mandrel location 61 of the first slot portion 101. When the pins 30 are disposed in the first mandrel location 61, the mandrel clamping element 56 is disposed at the collar first end 11. In addition, the first axis A1 is aligned with the fourth axis A4, whereby the arms 58 of the mandrel clamping element 56 are aligned with the lands 15. The first mandrel location 61 is positioned so that collar lands 15 are urged against the arms 58 by the coil spring 90 when no tool accessory 2 is mounted on the mandrel assembly 4 (shown). In addition, the mandrel 50 is prevented from rotation relative to the collar 10 because the arms 58 of the mandrel clamping element 56 are disposed between the respective posts 14 and each arm 58 is sector shaped and dimensioned to correspond to the shape and dimension of the lands 15.

In the first configuration, the pins 30 are urged against are urged against the circumferentially-extending facing surface 101(1) of the first slot portion 101 and retained in this position by the axial of the coil spring 90. Thus, the facing surface 101(1) of the first slot portion 101 serves as a stop to movement of the pins 30, and the first mandrel location 61 corresponds to a first locked position of the mandrel assembly 4.

Referring to FIG. 13, a user may initiate the transformation between the first and second configurations by manually moving the collar 10 in a first direction (represented by a solid linear arrow) toward the mandrel second end 52 against the axial force of the coil spring 90. As a result, the pins 30 move axially along the first slot portion 110 from the first mandrel location 61 to the second mandrel location 62. During movement between the first and second mandrel locations 61, 62, the mandrel 50 moves axially in a second direction (represented by a broken linear arrow) relative to the collar 10 without rotation such that the mandrel clamping element 56 moves away from the lands 15 while the first and the fourth axes A1, A4 remain in axial alignment.

Referring to FIG. 14, while continuing to move the collar 10 toward the mandrel second end against the axial force of the coil spring 90, the pins 30 move through the second slot portion 102 from the second mandrel location 62 to the third mandrel location 63. During movement between the second and third mandrel locations 62, 63, the mandrel 50 continues to move axially relative to the collar 10 such that the mandrel clamping element 56 moves still further away from the posts 14. In addition, circumferential movement of the pins 30 causes the mandrel 50 to rotate relative to the collar 10 in a first direction (represented by a solid curved arrow). As previously discussed, the second slot portion 102 may permit a relative rotation of about 85 degrees. FIG. 14 illustrates the pins 30 at a location mid-way between the second mandrel location 62 and the third mandrel location 63.

Referring to FIG. 15, as the pins 30 move along the third slot portion 103 from the third mandrel location 63 to the fourth mandrel location 64 against the axial force of the coil spring 90, the mandrel 50 moves circumferentially relative to the collar 10 without axial translation. The amount of rotation is about five degrees such that the total circumferential rotation permitted by the second and third slot portions 102, 103 is 90 degrees. FIG. 15 illustrates the pins 30 positioned at the fourth mandrel location 64, corresponding to a movement of the collar 10 through a first angle θ1 of 90 degrees relative to the mandrel 50 where the arc of the first angle θ1 is represented by a solid curved line.

When the pins 30 are in the fourth mandrel location 64, the mandrel clamping element 56 has rotated through a second angle θ2 relative to the collar 10 into axial alignment with the posts 14. In FIG. 15, the arc of the second angle θ2 is represented by a broken curved line. That is, the first axis A1 is aligned with the third axis A3, while the arms 58 of the clamping element 56 are slightly axially spaced apart from the end faces 14(1) of the respective posts 14.

Referring to FIG. 16, as the pins 30 move from the fourth mandrel location 64 to the fifth mandrel location 65 against the axial force of the coil spring 90, the mandrel 50 moves axially along the fourth slot portion 104 until the pins 30 rest in the mandrel fifth location 65. When the pins 30 are disposed in the fifth mandrel location 65, the first axis A1 is aligned with the third axis A3 such that the arms 58 of the mandrel clamping element 56 are aligned with the posts 14 and are spaced maximally apart from the end faces 14(1) of the respective posts.

The arrangement in which the first axis A1 is aligned with the third axis A3 while the arms 58 of the clamping element 56 are axially spaced apart from the end faces 14(1) of the respective posts 14 corresponds to the second, advanced configuration of the mandrel assembly 4. It should be noted that the second configuration is achieved when the pins 30 are disposed in the third or fourth slot portions 103, 104, including conditions where the pins 30 are in either the fourth mandrel location 64, the fifth mandrel location 65 or any position between the fourth and fifth mandrel location 64, 65.

When the pins 30 are in the fourth slot portion 104 and the user ceases to manually move the collar 10 toward the mandrel second end 52, the axial force of the coil spring 90 urges the collar 10 to move axially toward the mandrel first end 51. Because the third slot portion 103 extends in a purely circumferential direction, when the pins 30 reach the fourth pin location 64, the pins 30 are urged against the facing surface 103(1) of the third slot portion 103 and retained in this position by the axial of the coil spring 90. Thus, the facing surface 103(1) of the third slot portion 103 serves as a stop to axial movement of the pins 30, and the fourth pin location 64 corresponds to a second locked position of the mandrel assembly 4.

In the transformation from the first configuration as shown in FIG. 12 to the second configuration as shown in FIG. 16, the pins 30 have passed through the entire length of the respective slot 100. During passage of the pins 30 through the slots 100, the mandrel clamping element 56 has lifted off the lands 15 and rotated 90 degrees about the longitudinal axis 53.

In the advanced configuration, the accessory 2 can be mounted on the collar 10 or removed from the collar 10 since the arms 58 of the mandrel clamping element 56 are aligned with and spaced apart from the posts 14. Because the arms 58 are aligned with and spaced apart from the posts 14, by orienting the accessory so that the fifth axis AS is aligned with the first axis A1, the mandrel clamping element 56 and the posts 14 can be inserted into (or removed from) the hub opening 206 of the accessory 2 and the accessory 2 can be mounted on (or detached from) the first end surface 18(1) of the collar 10.

In order to fix an accessory 2 that is mounted on the collar 10 (not shown in FIG. 16) to the collar first end 11, the mandrel assembly 4 is allowed to move from the second configuration to the first configuration while the accessory 2 is resting against the collar first end surface 18(1).

A user may initiate the transformation from the second configuration to the first configuration by manually moving the collar 10 circumferentially out of the fourth mandrel position (e.g., out of the second locked position) and into the second slot portion 102. Upon release of the pins 30 from the second locked position, the biasing force of the coil spring urges the pins 30 toward the mandrel first end 51. During movement from the fourth mandrel location 64 to the first mandrel location 61, the mandrel 50 rotates in a direction that is opposite to the direction of rotation that occurred when transforming from the first configuration to the second configuration. For example, if the mandrel 50 rotated in a counter clockwise as viewed facing the mandrel first end 51 when transforming from the first configuration to the second configuration, the mandrel 50 rotates in the clockwise direction during transformation from the second configuration to the first configuration.

When an accessory 2 is mounted on the collar first end surface 18(1) and the mandrel assembly 4 is in the first configuration, the accessory 2 is prevented from relative rotation with respect to the collar 10 via engagement between the hub opening 206 of the accessory 2 and the posts 14 of the collar 10. In addition, since the portions 204(1) of the hub 204 adjacent to the central cut out 208 are axially aligned with and abut the lands 15 of the collar 10, the hub portions 204(1) are clamped between the arms 58 of the mandrel clamping element 56 and the lands 15 via the axial force of the coil spring 90.

To release the clamped accessory 2, the collar 10 is transformed from the first configuration to the second configuration by moving the pins 30 along the slots 100 from the first mandrel location 61 to the fifth mandrel location 65 as discussed above with respect to FIGS. 12-16.

The slots 100 are configured so that biasing force of the coil spring 90 maintains the clamping element 56 in a given one of the retracted or advanced configurations. To that end, the slots 100 each provide the two locked positions discussed above. The first locked position corresponds to the retracted configuration in which the pins 30 are disposed in the first mandrel location 61, and the arms 58 of the clamping element 56 abut the lands 15 of the collar 10. The second locked position corresponds to the advanced configuration in which the pins 30 are disposed in the fourth mandrel location 64, and in which clamping element 56 is spaced apart from the lands 15 of the collar 10 and the arms 58 of the clamping element 56 are aligned with the posts 14.

As described above, a mandrel assembly 4 is disclosed that allows an accessory 2 to be quickly and conveniently coupled to and/or decoupled from the mandrel assembly 4 without the need for an additional tool such as a screw driver. Therefore, the mandrel assembly 4 may be conveniently used to connect numerous interchangeable accessories such as cut-off wheels, polishing wheels, grinding wheels, sanding discs, or similar articles of manufacture to the power tool 1.

In the illustrated embodiment, both the mandrel 50 and the collar 10 are formed of metal such as steel. However, depending on the requirements of the specific application, the mandrel 50 may be formed of a different material than the collar 10. In some embodiments, the mandrel 50 and the collar 10 may be formed of alternative materials such as high strength polymers as determined by the requirements of the application.

In the illustrated embodiment, the collar 10 includes a pair of pins 30. The collar 10 is not limited to having two pins. For example, in some embodiments, the collar 10 includes a single pin 30. In other embodiments, the collar 10 includes multiple pairs of pins 30, e.g., four or more pins 30.

Selective illustrative embodiments of mandrel assembly for a power tool are described above in some detail. It should be understood that only structures considered necessary for clarifying the mandrel assembly have been described herein. Other conventional structures, and those of ancillary and auxiliary components of the mandrel assembly, power tool and accessory are assumed to be known and understood by those skilled in the art. Moreover, while working examples of the mandrel assembly have been described above, the mandrel assemblies are not limited to the working examples described above, but various design alterations may be carried out without departing from the device as set forth in the claims.

What is claimed is:

1. A mandrel assembly, comprising:
a mandrel including
a mandrel first end having a mandrel clamping element,
a mandrel second end that is opposite the mandrel first end,
a longitudinal axis that extends through the mandrel first end and the mandrel second end, and
a slot provided in an outer surface of the mandrel;
a collar that surrounds the mandrel, the collar including
a collar first end,
a collar second end that is opposite the first end, and
a sidewall that extends between the collar first end and the collar second end, the sidewall including an inner surface that defines a bore, the bore opening at the collar first end and the collar second end, the bore having a step change in diameter that defines a collar inner shoulder, and
a pin that protrudes from a surface of the bore and is received in the slot;
a retention washer fixed to the mandrel between the slot and the mandrel second end; and
a spring that surrounds the mandrel, the spring extending between the retention washer and the collar inner shoulder,
wherein
when the collar is moved relative to the mandrel in a first direction, the slot is configured to permit the mandrel to move relative to the collar in both rotation through a first angle about the longitudinal axis and translation in a second direction, the second direction being opposite the first direction, and
when the collar is moved relative to the mandrel in the second direction, the slot is configured to permit the mandrel to move relative to the collar in both rotation through a second angle about the longitudinal axis and translation in the first direction, the second angle being opposite the first angle.

2. The mandrel assembly of claim 1, wherein
at a first location of the slot, the slot is configured so that a biasing force of the spring maintains the mandrel clamping element at a first distance from the collar,
at a second location of the slot, the slot is configured so that a biasing force of the spring maintains the mandrel clamping element at a second distance from the collar, and
the second distance is greater than the first distance.

3. The mandrel assembly of claim 1, wherein when the collar is moved relative to the mandrel in the first direction, the slot is configured to permit the mandrel to translate linearly in the second direction, then rotate through the first angle, and then translate linearly in the second direction.

4. The mandrel assembly of claim 1, wherein the first angle is 90 degrees.

5. The mandrel assembly of claim 1, wherein the second angle is 90 degrees.

6. The mandrel assembly of claim 1, wherein the first and second directions are parallel to the longitudinal axis.

7. The mandrel assembly of claim 1, wherein the slot is configured so that as the mandrel rotates through one of the first angle and the second angle, the mandrel also translates in a direction parallel to the longitudinal axis.

8. The mandrel assembly of claim 1, wherein the slot includes
a first slot portion that extends linearly and in a direction parallel to the longitudinal axis,
a second slot portion that adjoins the first slot portion, the second slot portion extending in a direction parallel to the longitudinal axis and circumferentially along a curved path,
a third slot portion that adjoins the second slot portion, the third slot portion extending linearly and circumferentially, and
fourth slot portion that adjoins the third slot portion, the fourth slot portion extending linearly and axially.

9. The mandrel assembly of claim 8, wherein
the second and third slot portions in combination provide a path that when traveled by the pin results in a 90 degree rotation of the mandrel about the longitudinal axis.

10. The mandrel assembly of claim 8, wherein
movement of the pin in the first slot portion corresponds to a motion of the mandrel relative to the collar in which the mandrel clamping element is translated in the first direction,
movement of the pin in the second slot portion corresponds to a motion of the mandrel relative to the collar in which the mandrel clamping element is translated in the first direction and in which the mandrel rotates about the longitudinal axis,
movement of the pin in the third slot portion corresponds to a motion of the mandrel relative to the collar in which the mandrel rotates about the longitudinal axis, and
movement of the pin in the fourth slot portion corresponds to a motion of the mandrel relative to the collar in which the mandrel clamping element is translated in the first direction.

11. The mandrel assembly of claim 8, wherein
the first slot portion initiates at the mandrel first end,
the second slot portion, the third slot portion and the fourth slot portion are disposed between the mandrel first end and a mandrel shoulder, and
the mandrel shoulder is disposed between the mandrel first end and a point of the mandrel that is midway between the mandrel first end and the mandrel second end.

12. The mandrel assembly of claim 1, wherein
the collar includes posts that protrude from the collar first end in a direction parallel to the longitudinal axis,
the collar includes lands disposed between each adjacent pair of posts,
upon a relative movement in a direction parallel to the longitudinal axis between the collar and the mandrel, the slot is configured to permit the mandrel to move relative to the collar from a first configuration in which the mandrel clamping element is aligned with and abutting the lands, to a second configuration in which the mandrel clamping element is aligned with the posts and spaced apart from the posts.

13. The mandrel assembly of claim 1, wherein the slot includes a first mandrel location corresponding to a first locked position in which a biasing force of the spring maintains the clamping element in a retracted configuration relative to the collar, and a second mandrel location corresponding to a second locked position in which a biasing force of the spring maintains the clamping element in a retracted configuration relative to the collar.

14. The mandrel assembly of claim 13, wherein the first mandrel location corresponds to one end of the slot.

15. The mandrel location of claim 13, wherein the second mandrel location is disposed at a location between, and spaced apart from, each end of the slot.

16. The mandrel assembly of claim 13, wherein the first locked position corresponds to a dead end of the slot, and the second locked position corresponds to a step portion of the slot.

* * * * *